US009684965B1

(12) United States Patent
Takakura

(10) Patent No.: US 9,684,965 B1
(45) Date of Patent: Jun. 20, 2017

(54) OBSTACLE REMOVAL USING POINT CLOUD AND DEPTH MAP DATA

(71) Applicant: SONY CORPORATION, Tokyo (JP)

(72) Inventor: Hiroki Takakura, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/956,184

(22) Filed: Dec. 1, 2015

(51) Int. Cl.
*G06K 9/00* (2006.01)
*G06T 7/00* (2017.01)

(52) U.S. Cl.
CPC ............ *G06T 7/0079* (2013.01); *G06T 7/004* (2013.01); *G06T 7/0075* (2013.01); *G06T 2207/10028* (2013.01); *G06T 2207/20144* (2013.01)

(58) Field of Classification Search
CPC ........... G06K 9/00671; G06K 9/00805; H04N 13/0022; H04N 2013/0081
USPC ........................................................ 382/154
See application file for complete search history.

(56) References Cited

U.S. PATENT DOCUMENTS

| 2011/0123113 | A1 | 5/2011 | Berretty |
| 2013/0182184 | A1 | 7/2013 | Senlet |
| 2016/0317811 | A1* | 11/2016 | Greenberg ......... A61N 1/36046 |

FOREIGN PATENT DOCUMENTS

WO          2013117961        8/2013

OTHER PUBLICATIONS

Zou et al.; "Automatic Inpainting by Removing Fence-Like Structures in RGBD Images"; Machine Vision and Applications; Aug. 8, 2014; pp. 1841-1858.
He et al.; "Object Removal by Depth-Guided Inpainting"; Institute for Software Technology and Interactive Systems, Interactive and Multimedia Systems Group (IMS), Vienna University of Technology, Austria; Apr. 28, 2011; 8 pages.

(Continued)

*Primary Examiner* — Manuchehr Rahmjoo
(74) *Attorney, Agent, or Firm* — Fitch, Even, Tabin & Flannery LLP

(57) ABSTRACT

A system having a non-transitory storage medium, wherein the non-transitory storage medium contains a first image captured at a first position relative to background subject matter, wherein undesirable structure is interposed between the first position and the background subject matter, and a second image captured at a second position, different from the first position, relative to the background subject matter wherein the undesirable structure is interposed between the second position and the background subject matter; a point cloud generation module coupled to the non-transitory storage medium, wherein the point cloud generation module generates a point cloud in response to the first image and the second image, and wherein the point cloud generation module stores the point cloud in the non-transitory storage medium; an identification module coupled to the non-transitory storage medium for retrieving the point cloud and identifying within the point cloud the undesirable structure and the background subject matter; and an image generation module coupled to the identification module for generating a third image in response to the background subject matter within the point cloud, wherein the image generation module stores the third image in the non-transitory storage medium.

8 Claims, 6 Drawing Sheets

(56) References Cited

OTHER PUBLICATIONS

Yamashita et al.; "Fence Removal from Multi-Focus Images"; Department of Mechanical Engineering, Shizuoka University, Japan; May 14, 2010; 4 pages.
Lee et al.; "Removing Foreground Objects by Using Depth Information From Multi-View Images"; SPIE Proceedings; vol. 6696; Sep. 24, 2007; 2 pages.

* cited by examiner

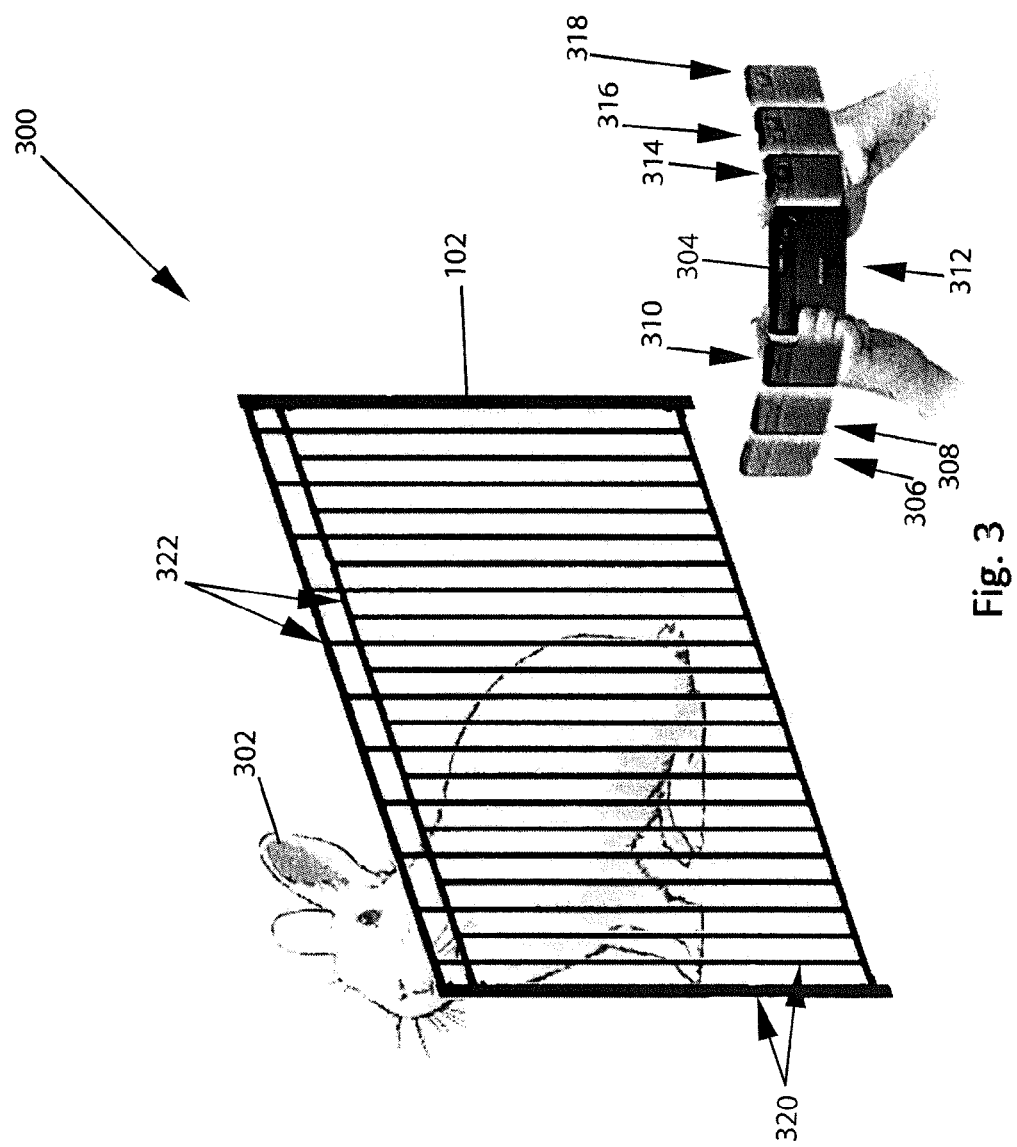

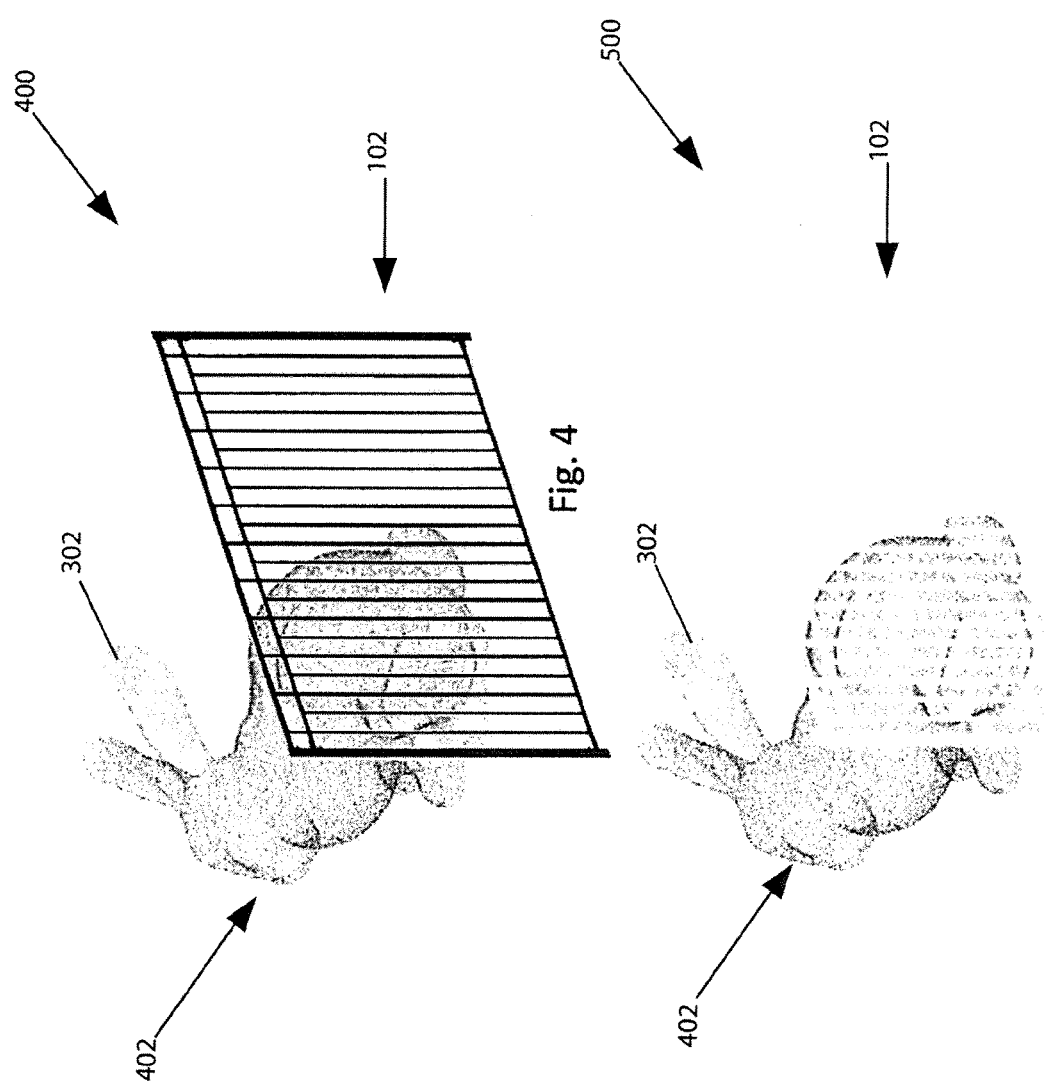

OBSTACLE REMOVAL USING POINT CLOUD AND DEPTH MAP DATA

BACKGROUND OF THE INVENTION

1. Field of the Invention

The present invention relates generally to obstacle removal using point cloud and depth map data, and more specifically to foreground obstacle removal in digitally captured images using point cloud and depth map data. Even more specifically, the present invention relates to foreground obstacle removal in digitally captured images using point cloud and depth map data to separate desired background subject matter from undesired foreground obstacles.

2. Discussion of the Related Art

When a picture (or image) is taken (or captured), its composition may include certain structures or objects that are undesirable. For example, when we take a photo of an outdoor scene, a building, sporting event, wildlife or other animals, or the like there may be structures (i.e., structures composed of geometric features characterized by foreground structure and openings through which background subject matter can be viewed, e.g., a fence or fence-like structure) located between the camera and the scene photographed.

Such structures may be esthetically undesirable to the photographer or artist capturing the image.

Many image editing or inpainting techniques have been recently developed to remove such undesirable structure and fill the holes left behind in a visually plausible way. However, many existing inpainting techniques require human interactions to label the undesirable structure to be removed. Such labels may take different forms, including strokes, structural boundaries, specified colors, etc. This human labeling step is usually labor intensive (especially in processing a large collection of images) and may require experience and skills.

SUMMARY OF THE INVENTION

Several embodiments of the invention advantageously address the needs above as well as other needs by providing a system and method for foreground obstacle removal in digitally captured images using point cloud and depth map data to separate desired background subject matter from undesired foreground obstacles.

In one embodiment, the invention can be characterized as a system comprising a non-transitory storage medium, wherein the non-transitory storage medium contains a first image captured at a first position relative to background subject matter, wherein undesirable structure is interposed between the first position and the background subject matter, and a second image captured at a second position, different from the first position, relative to the background subject matter wherein the undesirable structure is interposed between the second position and the background subject matter; a point cloud generation module coupled to the non-transitory storage medium, wherein the point cloud generation module generates a point cloud in response to the first image and the second image, and wherein the point cloud generation module stores the point cloud in the non-transitory storage medium; an identification module coupled to the non-transitory storage medium for retrieving the point cloud and identifying within the point cloud the undesirable structure and the background subject matter; and an image generation module coupled to the identification module for generating a third image in response to the background subject matter within the point cloud, wherein the image generation module stores the third image in the non-transitory storage medium.

In another embodiment, the invention can be characterized as a system comprising a camera comprising a non-transitory storage medium, wherein the non-transitory storage medium contains a first image captured by the camera at a first position relative to background subject matter, wherein undesirable structure is interposed between the first position and the background subject matter, and a second image captured by the camera at a second position, different from the first position, relative to the background subject matter wherein the undesirable structure is interposed between the second position and the background subject matter; a point cloud generation module coupled to the non-transitory storage medium, wherein the point cloud generation module generates a point cloud in response to the first image and the second image, and wherein the point cloud generation module stores the point cloud in the non-transitory storage medium; an identification module coupled to the non-transitory storage medium for retrieving the point cloud and identifying within the point cloud the undesirable structure and the background subject matter; and an image generation module coupled to the identification module for generating a third image in response to the background subject matter within the point cloud, wherein the image generation module stores the third image in the non-transitory storage medium; and a display device, wherein the display device is coupled to the camera, receives the third image from the camera and displays the third image in a human-perceptible form.

In a further embodiment, the invention may be characterized as a method comprising providing a non-transitory storage medium, wherein the non-transitory storage medium contains a first image captured at a first position relative to background subject matter, wherein undesirable structure is interposed between the first position and the background subject matter, and a second image captured at a second position, different from the first position, relative to the background subject matter wherein the undesirable structure is interposed between the second position and the background subject matter; generating a point cloud in response to the first image and the second image, and storing the point cloud in the non-transitory storage medium; retrieving the point cloud and identifying within the point cloud the undesirable structure and the background subject matter; generating a third image in response to the background subject matter within the point cloud; and storing the third image in the non-transitory storage medium.

BRIEF DESCRIPTION OF THE DRAWINGS

The above and other aspects, features and advantages of several embodiments of the present invention will be more apparent from the following more particular description thereof, presented in conjunction with the following drawings.

FIG. 3 is an illustration showing the esthetically undesirable structure, in the form of the fence-like structure, and the background subject matter in the form of a rabbit, and further showing a camera.

FIG. 4 is an illustration showing the esthetically undesirable structure, in the form of the fence-like structure shown, and the background subject matter in the form of the rabbit, wherein the rabbit is shown as a set of data points comprising a point cloud, such as may be generated by the embodiment of FIG. 3.

FIG. 5 is an illustration showing the esthetically undesirable structure having been removed from an image and the background subject matter in the form of the rabbit, wherein the rabbit is shown as a set of data points comprising a point cloud, such as may be generated by the embodiment of FIG. 3.

Figure 2:
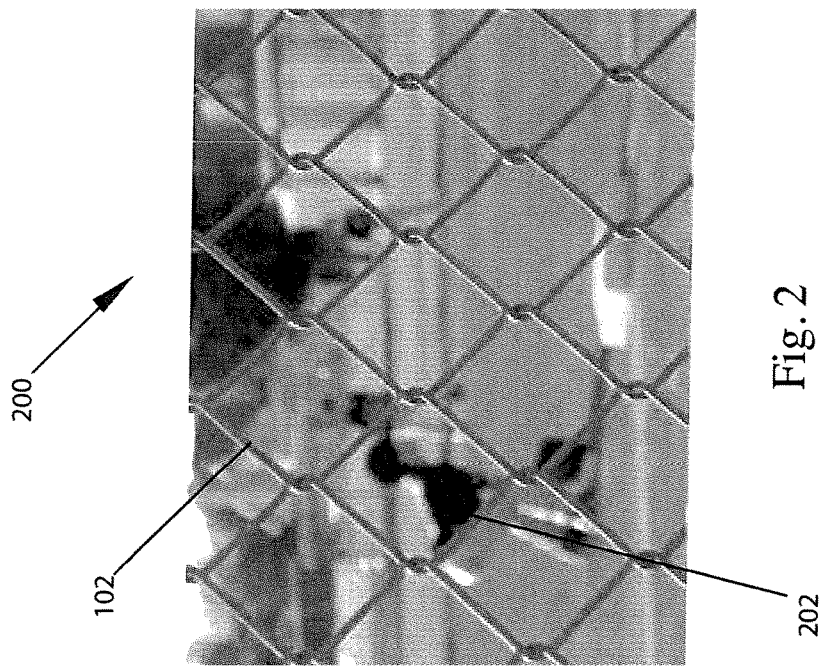
FIG. 2 is another exemplary image showing the esthetically undesirable structure, in the form of the fence-like structure, and the background subject matter in the form of a young athlete.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

In accordance with the present embodiment, a geometric features making up undesirable structure in an image are defined by a predefined geographic shape that permits full view of the background subject matter provided that the background subject matter is viewed from a plurality of positions selected as a function of the predefined geographic shape. For example, in the case of a fence or fence-like structure composed of one or more sets of parallel structures, e.g., vertical posts, and horizontal cross-members, the plurality of positions must include positions (at least two) defined by a linear relationship between the positions that is not parallel to the one or more parallel structures and a distance between positions that is sufficiently far, as a function of the distance between the camera and the background subject matter and the width of the parallel structures, that the full view of the background subject matter is available in a set of images captured at the plurality of positions.

Figure 1:
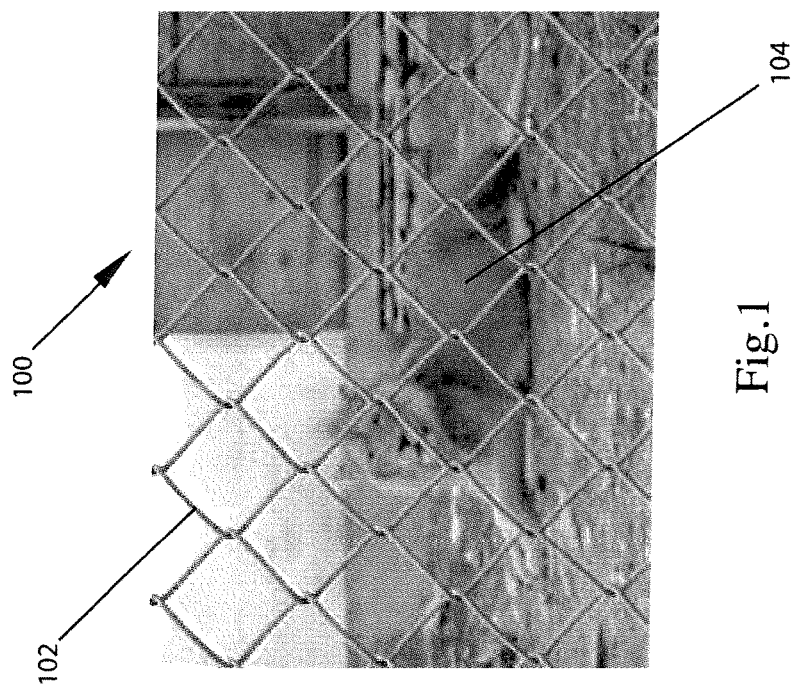
FIG. 1 is an exemplary image showing esthetically undesirable structure, in the form of a fence-like structure, and background subject matter in the form of a lion.

Referring first to FIG. 1, an exemplary image 100 is shown showing esthetically undesirable structure 102, in the form of a fence-like structure, and background subject matter 104 in the form of a lion.

Referring next of FIG. 2, another exemplary image 200 is shown showing the esthetically undesirable structure 102, in the form of the fence-like structure, and the background subject matter 202 in the form of a young athlete.

Referring next to FIG. 3, an illustration 300 is shown showing the esthetically undesirable structure 102, in the form of the fence-like structure, and the background subject matter 302 in the form of a rabbit, and further showing a camera 304.

The esthetically undesirable structure 102, is shown, as interposed between the background subject matter 302 and the camera 304.

The camera 304 is shown in a plurality of positions 306, 308, 310, 312, 314, 316, 318.

In operation, the camera 304 is positioned in a first position 308 and directed to (i.e., aimed at) the subject matter 302, with the undesirable structure 102 interposed therein between, so as to take a picture of, i.e., capture an image of, the subject matter 302. A first image is then captured. Next, the camera 304 is moved to a second position 316. A line (not shown) between the first position 308 and the second position 316 is not parallel to any part of the undesirable structure 102. In the case illustrated, this means that the line between the first position 308 and the second position 316 is not parallel to vertical components 320 of the fence, and furthermore, is not parallel to the horizontal components 322 of the fence.

In the event more than two images are captured, a line between at least two of the positions 306, 308, 310, 312, 314, 316, 318 must meet these criteria. However, it is not required that all of the lines between all of the positions 306, 308, 310, 312, 314, 316, 318 meet these criteria. For example, in the event three images are captured at first position 308, a second position 316, and a third position 312, respectively, the line between the first position 308 and the second position 316 may be parallel to the horizontal components 322 of the fence, and the line between the second position 316 and the third position 312 may be parallel to the vertical components 320 of the fence. However, the line between the first position 308 and the third position 312 should not be parallel to either the vertical components 320 of the fence, or the horizontal components 322 of the fence. Note that this exemplary geometry is not illustrated.

In addition, the distance between the positions 306, 308, 310, 312, 314, 316, 318 must be sufficient that the entire background subject matter 302 can be composed by combining the images captured. This is described further herein below in reference to FIG. 7.

Returning to the example in which only two images are captured, after the camera 312 is moved to the second position 316, a second image is captured, again with the line between the first position 308 and the second position 316 being as defined above.

The first image and the second image are then combined electronically to generate a point cloud (i.e., a three-dimensional representation of the undesirable structure 102 and the subject matter 302), as described herein below, and the undesirable structure 102 are electronically identified based on their depth within the point cloud and/or a space between the undesirable structure 102 and the subject matter 302 within the point cloud, and the undesirable structure 102 are then eliminated from (deleted from) the point cloud. A resultant image (i.e., a two-dimensional image) is then generated, and output as described herein below.

Referring next to FIG. 4, an illustration 400 is shown showing the esthetically undesirable structure 102, in the form of the fence-like structure, and the background subject matter 302 in the form of the rabbit, wherein the rabbit is shown as a set of data points comprising a point cloud 402, such as may be generated by the embodiment of FIG. 3.

Figure 7:
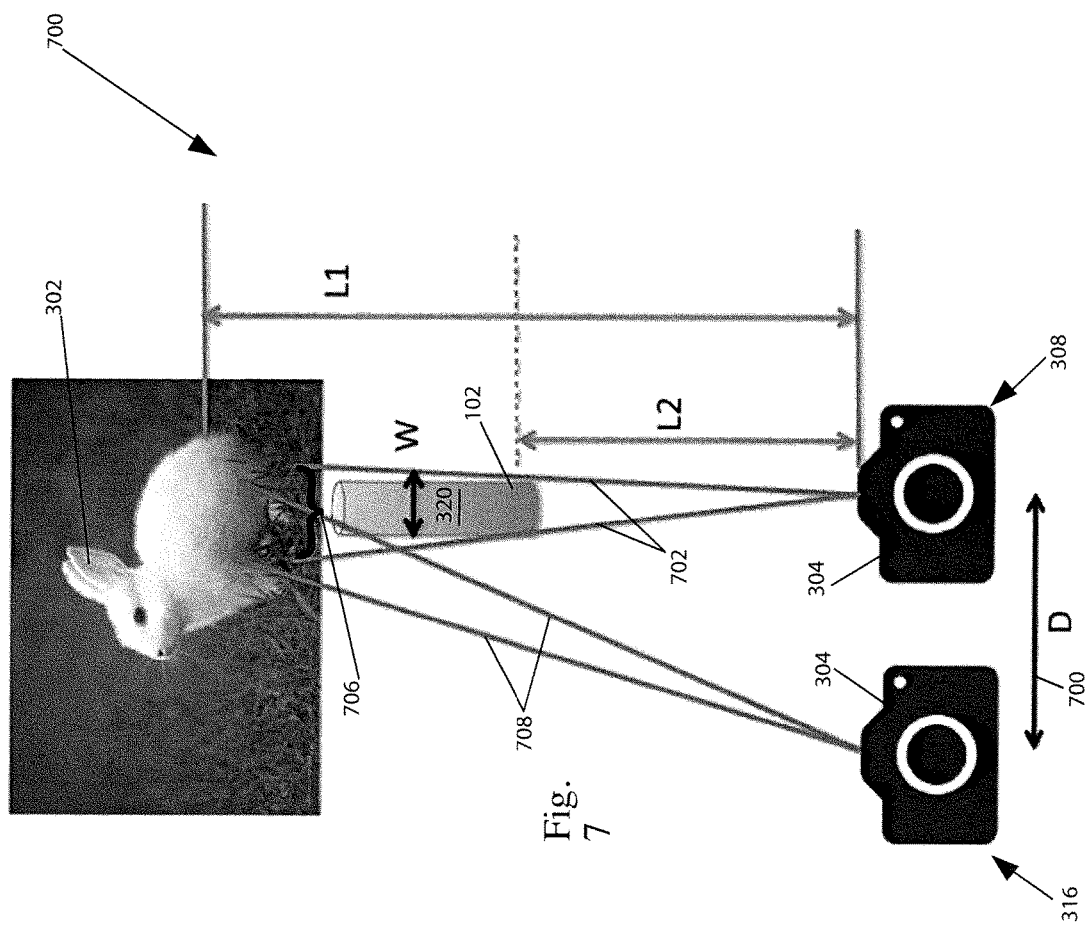
FIG. 7 is a schematic illustration of the relationship between background subject matter, undesirable structure and positions of a camera, such as may be utilized in the embodiment of FIG. 3.

In operation, utilizing the first image and the second image, as described in reference to FIG. 3, above, a point cloud 402 is generated using heretofore known techniques. The point cloud 402 is a set of data points in some coordinate system. In a three-dimensional coordinate system, these points are usually defined using rectangular coordinates, and are often intended to represent the external surface of an object, such as, in this case, the background subject matter 302 in the form of the rabbit. In addition, point cloud 402 data points are also generated for the undesirable structure 102 such as in this case, the fence or the fence-like structure. By ensuring that the distance between the first position and the second position, as described above, and as further described below in reference to FIG. 7, is sufficient, an accurate point cloud of both the undesirable structure and the background subject matter can be generated without any "shadowing" of the background subject matter 302 by the undesirable structure 102. Furthermore, because, as viewed in the point cloud 402, there is a discernable space between the background subject matter 302 and the undesirable structure 102 (and the background subject matter 302 is at a greater depth relative to the first position and the second position than the undesirable structure 102), the undesirable structure 102 can be electronically identified and eliminated from (i.e., deleted from) the point cloud 402.

Referring next to FIG. 5, an illustration 500 is shown showing the esthetically undesirable structure 102 (represented with dotted lines) having been removed from an image and the background subject matter 302 in the form of the rabbit, wherein the rabbit is shown as a set of data points comprising the point cloud 402, such as may be generated by the embodiment of FIG. 3.

As noted above, a discernable space between the undesirable structure 102 and the background subject matter 302 is identified and employed by components of the present embodiment in order to delete the undesirable structure 102 from the point cloud 402.

The point cloud 402 is then electronically projected onto a plane (not shown) in order to obtain a resultant image of the background subject matter 302, with the undesirable structure 102 having been deleted. Alternatively, the background subject matter 302 may be identified based on a particular depth, i.e., distance from the camera positions (shown in FIG. 3), with anything closer to the camera positions being defined as esthetically undesirable structure 102.

Figure 6:
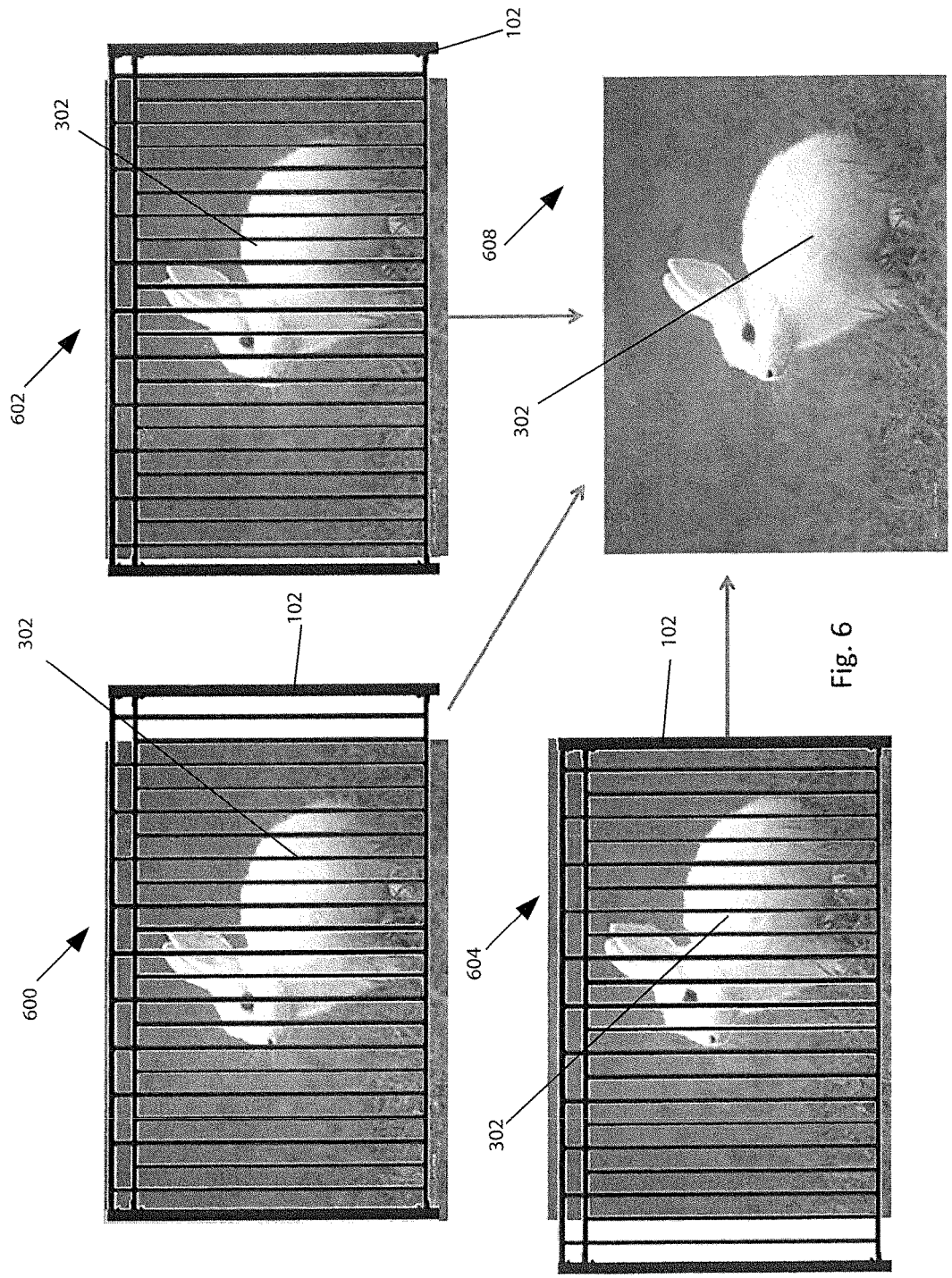
FIG. 6 is four exemplary images, three of which contain the undesirable structure captured from three different positions of a camera, and a fourth of which is generated as a function of the three, wherein the undesirable structure are deleted, such as may be generated by the embodiment of FIG. 3.

Referring next to FIG. 6, four exemplary images 600, 602, 604, 608 are shown, three 600, 602, 604 of which contain the undesirable structure 102 captured from three different positions of the camera 312 (FIG. 3), and a fourth 608 of which is generated as a function of the three 600, 602, 604, wherein the undesirable structure 102 is deleted, such as may be generated by the embodiment of FIG. 3.

A first 600 of the three images shows the background subject matter 302, with the undesirable structure 102 interposed between the camera 312 and the background subject matter 302. As will be noted, the undesirable structure 102 is in a first position relative to the background subject matter 302. In a second image 602, the undesirable structure 102 is in a second position relative to the background subject matter 302, this "movement" of the undesirable structure 102 is achieved by moving the camera 312 from a first position 308 to a second position 316 in taking the first image and the second image, respectively. Also shown is the third image 604 of the background subject matter 302 in which the undesirable structure 102 is shown in a third position 312 relative to the background subject matter 302. This further "movement" of the undesirable structure 102 is achieved by moving the camera 312 to a third position during the capture of the third image 604. These three images 600, 602, 604 are utilized in the generation of the point cloud 402 (FIGS. 4 AND 5), as described hereinabove. And, as will be noted, the positions 308, 312, 316 include at least two positions for which a line between the two positions is not parallel to any of the components of the undesirable structure 102, for example, the horizontal or vertical components of the fence. Utilizing the point cloud 402, a discernable space between the undesirable structure 102 and the background subject matter 302 is identified, or a distance from the camera 312 in the positions 308, 312, 316 is defined in order to separate the background subject matter 302 from the undesirable structure 102. As referenced above, the undesirable structure 102 is then deleted from the point cloud 402, and the remaining points in the point cloud 402 are projected onto a plane in order to generate a fourth image. As illustrated, the fourth image 608 is an image depicting the background subject matter 302, in this case a rabbit, wherein the undesirable structure 102, in this case, a fence, has been deleted.

In accordance with one variation, the distance from the camera 312 can be defined manually, such as by a slider, which may be displayed on the display of the camera 312, that is manipulated (such as by a touch screen, arrow keys, joystick, a mechanized slider or the like in order to indicate the distance which is defined as further away from the camera than the undesirable structure 103 and closer to the camera than the background subject matter 302.

Preferably the distance is selected by the user after the first image 600, second image 602 and third image 604 are captured. The display of the camera may show the resultant image in real time as the user defines the distance, such as by manipulating the slider, thereby allowing the user to see the undesirable structure "disappear" as the distance is defined from a plane in front of the undesirable structure, then through the undesirable structure 103 to a plane between the undesirable structure 103 and the background object matter 302.

In accordance with another variation, the distance from the camera 312 can be defined automatically by a processor modified with software within the camera 312. In accordance with this other variation density of the point cloud 402 is evaluated as a function of distance from the camera 312. This elevation will result in a distinct peak density corresponding to the undesirable structure 103, and another peak density representing the background subject matter 302. From within a range of distances between the distinct peak and the other peak, the distance is automatically selected.

Referring next to FIG. 7, a schematic illustration 700 is shown of the geometric relationship between background subject matter 302, undesirable structure 102 and positions 308, 316 of a camera 312, such as may be utilized in the embodiment of FIG. 3.

As shown, the background subject matter 302 and the camera 304 have undesirable structure 102 interposed therein between. In order to simplify this explanation, only one of the vertical members 320 of the fence is schematically depicted. While the camera 304 is in a first position 308, a portion of the background subject matter 302 is obstructed by the vertical member 320 of the fence, as represented by a first pair of lines 702. The vertical member 320 of the fence has a width W, and is a distance L2 from the camera 304 during the capture of the first image. The background subject matter 302 is at a distance L1, which is greater than the distance L2, from the camera 304 during the capture of the first image. The camera 304 is then moved to a second position 316 with a line 704 between the first position 308 and the second position 316 having a direction that is not parallel to the vertical member 320 illustrated, and being at least a distance D from the first position 308 such that the portion 706 of the background subject matter 302 obstructed by the vertical member 320 having width W is now seen by the camera 304, as illustrated by the second pair of lines 708. As such, the combination of the first image and the second image provides a complete representation of the background subject matter 302. The undesirable structure 102 can be eliminated by eliminating all points within the above-mentioned point cloud 402 that are no more than a distance L2 from the camera 304, while positioning the subject matter 302 at the distance L1 from the camera 304.

Figure 8:
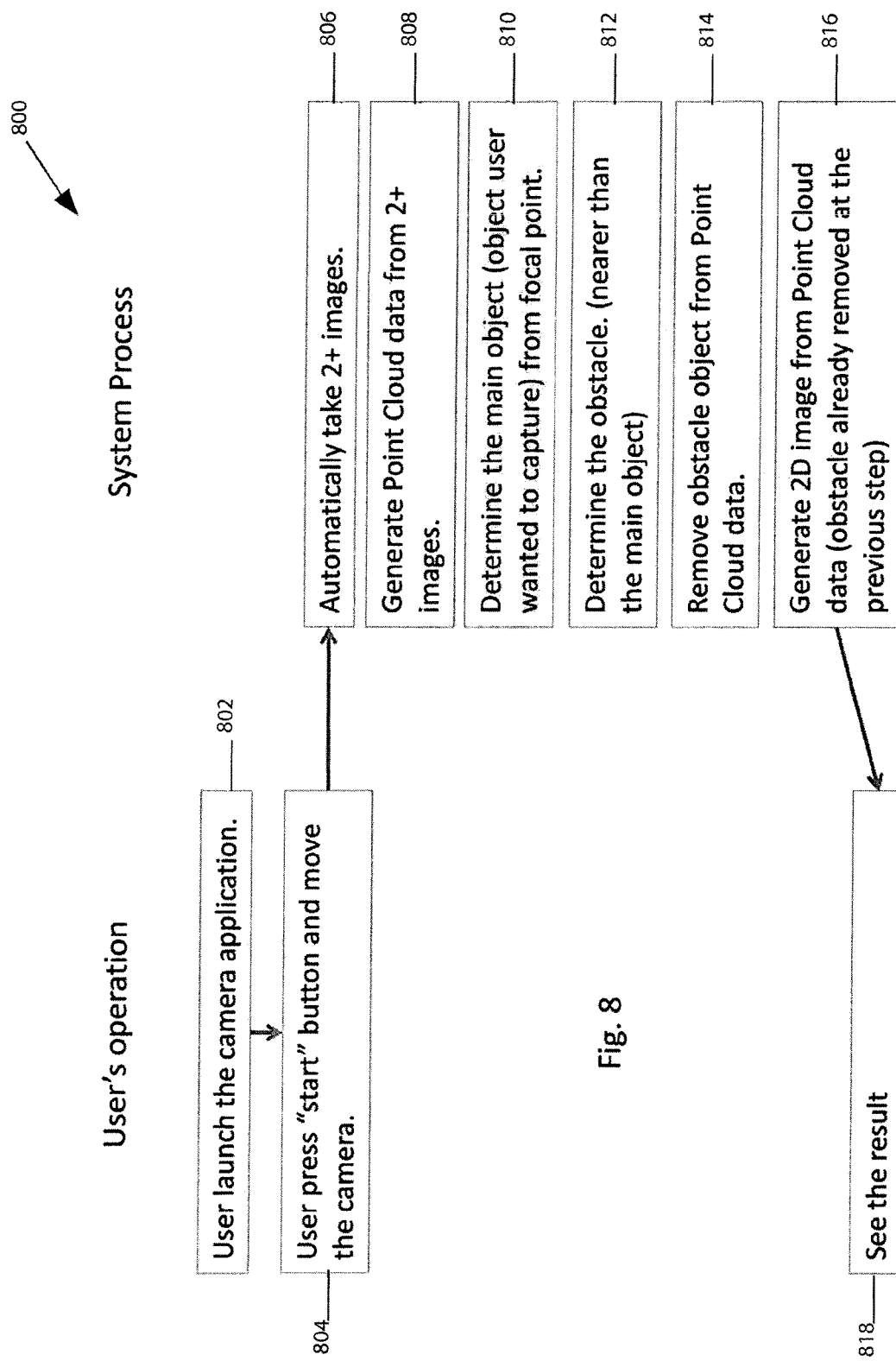
FIG. 8 is a flow chart showing a process for generating an image in which undesirable structure are deleted, such as may be utilized in the embodiment of FIG. 3.

Referring next to FIG. 8, a flow chart 800 showing a process for generating an image in which undesirable structure 102 is deleted, such as may be utilized in the embodiment of FIG. 3.

At the outset 802, in accordance to one embodiment, a user of the camera 304 initiates operation of a function or application of the camera adapted to perform the operations described herein. The user may then, for example, depress 804 a "start" button and simultaneously therewith move the camera along the line that is not parallel to any of the undesirable structure 102. Following the pressing of the start button, the camera may then be directed 806 through electronic, software, or mechanical means to automatically capture two or more images. In accordance with the present embodiment, the camera 304 then generates 808 the above-described point cloud 402 data from the two or more images and determines 810, 812 the background subject matter 302 by identifying a discernable space between the undesirable structure 102 and the background subject matter 302 within the point cloud 402, or defining a distance from the camera 304 during image capture beyond which the background subject matter 302 is present, and closer than which the undesirable structure 102 is present. (Alternatively, these steps 808, 810, and/or 812 may be performed at a location remote from the camera 304, such as on a server coupled to the camera via a communications network.) The camera 304 then deletes 814 (or otherwise separates) the undesirable structure 102 from the remainder of the point cloud 402 data, and projects 816 the remaining background subject matter 302 data of the point cloud on to a plane, and outputs 818 this projection as a two-dimensional image. (Again, these steps 814 and/or 816 may be performed remotely at the server.) This output may be in the form of a digital image file that may, for example, be saved within the camera 304 to a non-transitory medium, or can be transmitted via a communications channel to a remote location at which it can be saved to a non-transitory medium. In addition, or alternatively, the image may be displayed on a display screen on the camera, or located remotely from the camera, or may be printed on to paper by the camera, or at a location remote from the camera, such as by a photo printer.

While the invention herein disclosed has been described by means of specific embodiments, examples and applications thereof, numerous modifications and variations could be made thereto by those skilled in the art without departing from the scope of the invention set forth in the claims.

What is claimed is:

1. A system comprising:
a non-transitory storage medium, wherein the non-transitory storage medium contains:
    a first image captured by a camera at a first position relative to background subject matter, wherein undesirable structure is interposed between the first position and the background subject matter; and
    a second image captured by the camera at a second position, different from the first position, relative to the background subject matter wherein the undesirable structure is interposed between the second position and the background subject matter;
wherein said non-transitory storage medium comprises a plurality of non-transitory storage devices, said non-transitory storage medium comprises at least two types of said plurality of non-transitory storage devices, wherein said at least two types are selected from a group of types consisting of: volatile memory, non-volatile memory, optical storage, magnetic storage, electrostatic storage, and solid state storage;
a point cloud generation module coupled to the non-transitory storage medium, wherein the point cloud generation module generates a point cloud in response to the first image and the second image, and wherein the point cloud generation module stores the point cloud in the non-transitory storage medium;
an identification module coupled to the non-transitory storage medium for retrieving the point cloud and identifying within the point cloud the undesirable structure and the background subject matter; and
an image generation module coupled to the identification module for generating a third image in response to the background subject matter within the point cloud, wherein the generating comprises removing the undesirable structure having been identified, wherein the image generation module stores the third image in the non-transitory storage medium.

2. The system of claim 1 further comprising:
said identification module, wherein said identification module identifies said undesirable structure and the background subject matter by identifying said undesirable structure within the point cloud as being closer to the camera than a predefined distance, and by identifying said background subject matter as being farther from the camera than a predefined distance.

3. The system of claim 1 further comprising:
a camera coupled to said non-transitory storage medium;
a first housing for the camera;
a second housing for said non-transitory storage medium, said point cloud generation module, said identification module, and said image generation module; and
a communications network, wherein the communications network is interposed between said camera and said non-transitory storage medium, wherein said communications network carries the first image and the second image from said camera to said non-transitory storage medium.

4. The system of claim 1 further comprising:
a camera coupled to a first memory of said non-transitory storage medium;
a first housing for said camera, the first memory of said non-transitory storage medium, and said point cloud generation module, wherein said point cloud generation module stores the point cloud in the first memory of said non-transitory storage medium;
a second housing for said identification module, said image generation module, and a second memory of said non-transitory storage medium, wherein said image generation module stores the third image in the second memory of said non-transitory storage medium; and
a communications network, wherein the communications network is interposed between said point cloud generation module and said image generation module, wherein said communications network carries the point cloud from said point cloud generation module to said image generation module.

5. A system comprising:
a camera comprising:
 a non-transitory storage medium, wherein the non-transitory storage medium contains:
  a first image captured by the camera at a first position relative to background subject matter, wherein undesirable structure is interposed between the first position and the background subject matter; and
  a second image captured by the camera at a second position, different from the first position, relative to the background subject matter wherein the undesirable structure is interposed between the second position and the background subject matter;
 wherein said non-transitory storage medium comprises a plurality of non-transitory storage devices, said non-transitory storage medium comprises at least two types of said plurality of non-transitory storage devices, wherein said at least two types are selected from a group of types consisting of: volatile memory, non-volatile memory, optical storage, magnetic storage, electrostatic storage, and solid state storage;
 a point cloud generation module coupled to the non-transitory storage medium, wherein the point cloud generation module generates a point cloud in response to the first image and the second image, and wherein the point cloud generation module stores the point cloud in the non-transitory storage medium;
 an identification module coupled to the non-transitory storage medium for retrieving the point cloud and identifying within the point cloud the undesirable structure and the background subject matter; and
 an image generation module coupled to the identification module for generating a third image in response to the background subject matter within the point cloud, wherein the generating comprises removing the undesirable structure having been identified, wherein the image generation module stores the third image in the non-transitory storage medium; and
a display device, wherein the display device is coupled to the camera, receives the third image from the camera and displays the third image in a human-perceptible form.

6. The system of claim 5 further comprising:
said identification module, wherein said identification module identifies said undesirable structure and the background subject matter by identifying said undesirable structure within the point cloud as being closer to the camera than a predefined distance, and by identifying said background subject matter as being farther from the camera than a predefined distance.

7. The system of claim 5 further comprising:
a first housing for the camera;
a second housing for the display device; and
a communications network wherein the communications network is interposed between said camera and said display device, wherein said communications network carries said third image between said first housing and said second housing.

8. A method comprising:
providing a non-transitory storage medium, wherein the non-transitory storage medium contains:
 a first image captured by a camera at a first position relative to background subject matter, wherein undesirable structure is interposed between the first position and the background subject matter; and
 a second image captured by the camera at a second position, different from the first position, relative to the background subject matter wherein the undesirable structure is interposed between the second position and the background subject matter;
wherein said non-transitory storage medium comprises a plurality of non-transitory storage devices, said non-transitory storage medium comprises at least two types of said plurality of non-transitory storage devices, wherein said at least two types are selected from a group of types consisting of: volatile memory, non-volatile memory, optical storage, magnetic storage, electrostatic storage, and solid state storage;
generating a point cloud in response to the first image and the second image, and storing the point cloud in the non-transitory storage medium;
retrieving the point cloud and identifying within the point cloud the undesirable structure and the background subject matter;
generating a third image in response to the background subject matter within the point cloud, wherein the generating comprises removing the undesirable structure having been identified; and
storing the third image in the non-transitory storage medium.

* * * * *